(12) United States Patent
Wu et al.

(10) Patent No.: US 11,653,233 B2
(45) Date of Patent: May 16, 2023

(54) METHOD AND TERMINAL FOR MONITORING A RADIO LINK

(71) Applicant: VIVO MOBILE COMMUNICATION CO., LTD., Guangdong (CN)

(72) Inventors: Yumin Wu, Dongguan (CN); Wei Bao, Dongguan (CN); Yitao Mo, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 17/116,513

(22) Filed: Dec. 9, 2020

(65) Prior Publication Data

US 2021/0092623 A1   Mar. 25, 2021
US 2021/0274365 A2   Sep. 2, 2021

Related U.S. Application Data

(63) Continuation-in-part of application No. PCT/CN2019/089253, filed on May 30, 2019.

(30) Foreign Application Priority Data

Jun. 15, 2018   (CN) .................. 201810622024.9

(51) Int. Cl.
*H04W 24/08*   (2009.01)
*H04J 3/06*    (2006.01)
*H04L 5/00*    (2006.01)
*H04W 56/00*   (2009.01)

(52) U.S. Cl.
CPC .......... *H04W 24/08* (2013.01); *H04J 3/0652* (2013.01); *H04L 5/0051* (2013.01); *H04W 56/001* (2013.01)

(58) Field of Classification Search
CPC .... H04L 5/0051; H04W 24/02; H04W 24/08; H04W 56/001; H04W 56/0015; H04W 56/003; H04W 56/0035
See application file for complete search history.

(56) References Cited

U.S. PATENT DOCUMENTS

| | | | |
|---|---|---|---|
| 2012/0287920 A1 | 11/2012 | Futaki et al. | |
| 2015/0055488 A1 | 2/2015 | Chen et al. | |
| 2015/0245402 A1* | 8/2015 | Mochizuki | H04W 36/22 370/328 |
| 2017/0048736 A1 | 2/2017 | Marinier et al. | |

(Continued)

FOREIGN PATENT DOCUMENTS

| | | |
|---|---|---|
| CN | 101478816 A | 7/2009 |
| CN | 101483927 A | 7/2009 |

(Continued)

OTHER PUBLICATIONS

Zte et al. "RLM in NR," 3GPP TSG RAN WG1 Meeting NR#3, R1-1715384, Nagoya, Japan, Sep. 18-21, 2017, Sep. 19, 2017.

(Continued)

*Primary Examiner* — Pao Sinkantarakorn
(74) *Attorney, Agent, or Firm* — Harness, Dickey & Pierce, P.L.C.

(57) ABSTRACT

A radio link monitoring method, the method includes: generating an indication indicating that a reference signal is not detected if the reference signal is not detected; and performing radio link monitoring according to the indication.

20 Claims, 3 Drawing Sheets

(56) References Cited

U.S. PATENT DOCUMENTS

| | | |
|---|---|---|
| 2018/0160328 A1 | 6/2018 | Chendamarai Kannan et al. |
| 2019/0052377 A1* | 2/2019 | Hwang ................. H04L 5/0035 |
| 2019/0182691 A1 | 6/2019 | Wang et al. |
| 2019/0313324 A1* | 10/2019 | Dalsgaard ............. H04L 5/0082 |
| 2019/0380052 A1* | 12/2019 | Yang ....................... H04L 5/001 |
| 2021/0242923 A1* | 8/2021 | Takeda ................... H04B 7/088 |

FOREIGN PATENT DOCUMENTS

| | | |
|---|---|---|
| CN | 107787005 A | 3/2018 |
| WO | WO-2017136666 A1 | 8/2017 |

OTHER PUBLICATIONS

ZTE. "Radio Link Monitoring in NR," 3GPP TSG RAN WG1 Meeting #90, R1-1712070, Prague, Czhechia, Aug. 21-25, 2017, Aug. 21, 2017.

First Office Action regarding Chinese Patent Application No. 201810622024.9, dated May 8, 2020. Translation provided by Bohui Intellectual Property.

Second Office Action regarding Chinese Patent Application No. 201810622024.9, dated Nov. 2, 2020. Translation provided by Bohui Intellectual Property.

International Search Report and Written Opinion regarding International Application No. PCT/CN2019/089253, dated Aug. 9, 2019. Translation provided by Bohui Intellectual Property.

Ericsson, "RRM framework in NR-U," 3GPP TSG-RAN WG2 #102, Busan, S. Korea, May 21-25, 2018; TDoc R2-1808149 (Resubmission of R2-1805740).

Supplementary European Search Report regarding International Application No. EP19819978.8-1205/3813279 / PCT/CN2019/089253, dated Jul. 19, 2021.

* cited by examiner

METHOD AND TERMINAL FOR MONITORING A RADIO LINK

CROSS-REFERENCE TO RELATED APPLICATION

This application is a Bypass Continuation-in-part Application of PCT/CN2019/089253 filed May 30, 2019, which claims priority to Chinese Patent Application No. 201810622024.9, filed on Jun. 15, 2018, titled "METHOD AND TERMINAL FOR MONITORING A RADIO LINK", which are incorporated herein by reference in their entireties.

TECHNICAL FIELD

The present disclosure relates to the field of communications technologies, and more particularly to a method and a terminal for monitoring a radio link.

BACKGROUND

When a terminal performs radio link monitoring (RLM), currently a monitoring result is generally obtained according to out-of-synchronization (out-of-sync) indications and in-synchronization (in-sync) indications. That is, when the number of consecutively received out-of-sync indications is equal to N310, a timer T310 is started.

SUMMARY

In a first aspect, some embodiments of the present disclosure provide a method for monitoring a radio link, which is applied to a terminal. The method includes:
generating an indication indicating that a reference signal is not detected if the reference signal is not detected; and
performing RLM according to the indication.

In a second aspect, some embodiments of the present disclosure provide a terminal. The terminal includes:
a processor is configured to generate an indication indicating that a reference signal is not detected if the reference signal is not detected; and perform RLM according to the indication.

In a third aspect, some embodiments of the present disclosure provide a non-transient computer-readable storage medium. The non-transient computer-readable storage medium has stored thereon a computer program that, when executed by a processor, implements steps in the method for monitoring the radio link.

BRIEF DESCRIPTION OF THE DRAWINGS

In order to describe technical solutions in embodiments of the present disclosure, the accompanying drawings to be used in the description of embodiments of the present disclosure will be introduced briefly. Obviously, the accompanying drawings to be described below are merely some embodiments of the present disclosure, and a person of ordinary skill in the art may also obtain other drawings according to those drawings without paying any creative effort.

DETAILED DESCRIPTION

The technical solutions in the embodiments of the present disclosure will be described clearly and completely with reference to accompanying drawings in the embodiments of the present disclosure. Obviously, the described embodiments are merely some but not all embodiments of the present disclosure. All other embodiments obtained on the basis of the embodiments of the present disclosure by a person of ordinary skill in the art without paying any creative effort shall be included in the protection scope of the present disclosure.

The term "and/or" herein is merely used to describe an association relationship of associated objects, which represents three kinds of relationships. For example, the phrase "A and/or B" represents three conditions: A exists alone, both A and B exist, and B exists alone. In addition, the character "/" herein generally indicates that the associated objects are in an "or" relationship. The character "/" in a formula indicates that the associated objects are in a "division" relationship. The term "plurality" herein means two or more unless otherwise specified.

Figure 1:
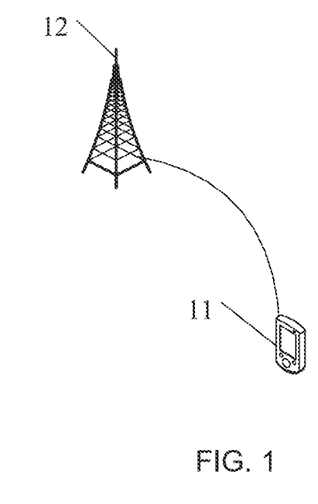
FIG. 1 is a structural diagram of a network system for some embodiments of the present disclosure.

Referring to FIG. 1, FIG. 1 is a structural diagram of a network system for some embodiments of the present disclosure. As shown in FIG. 1, the network system includes a user equipment (UE) 11 and a network side device 12. The UE 11 may be a terminal side device such as a phone, a tablet personal computer, a laptop computer, a personal digital assistant (PDA), a mobile internet device (MID) or a wearable device. It will be noted that a specific type of the UE 11 is not limited in the some embodiments of the present disclosure. The network side device 12 may be a macro cell, an LTE eNB, a 5G NR NB, etc.; the network side device 12 may also be a small cell, such as a low power node (LPN), a pico cell or a femto cell; or the network side device 12 may be an access point (AP). The network side device 12 may also be one of network nodes composed of a central unit (CU) and a plurality of transmission reception points (TRPs) managed and controlled by the CU. It will be noted that a specific type of the network side device 12 is not limited in the some embodiments of the present disclosure.

When the terminal performs RLM, the number of consecutively received out-of-sync indications is equal to N310, a timer T310 is started. If the number of consecutively received in-sync indications is equal to N311 while T310 is running, the T310 is stopped, indicating that link synchronization has been recovered; if the T310 expires, consider radio link failure to be detected, and then a radio resource control (RRC) connection reestablishment procedure is initiated. However, at present, when the terminal does not receive a reference signal, since a monitoring result is obtained only according to out-of-sync indications and in-sync indications, it is easy to determine wrongly that the radio link has a problem, thereby resulting in low accuracy of the monitoring result of the RLM.

Figure 2:
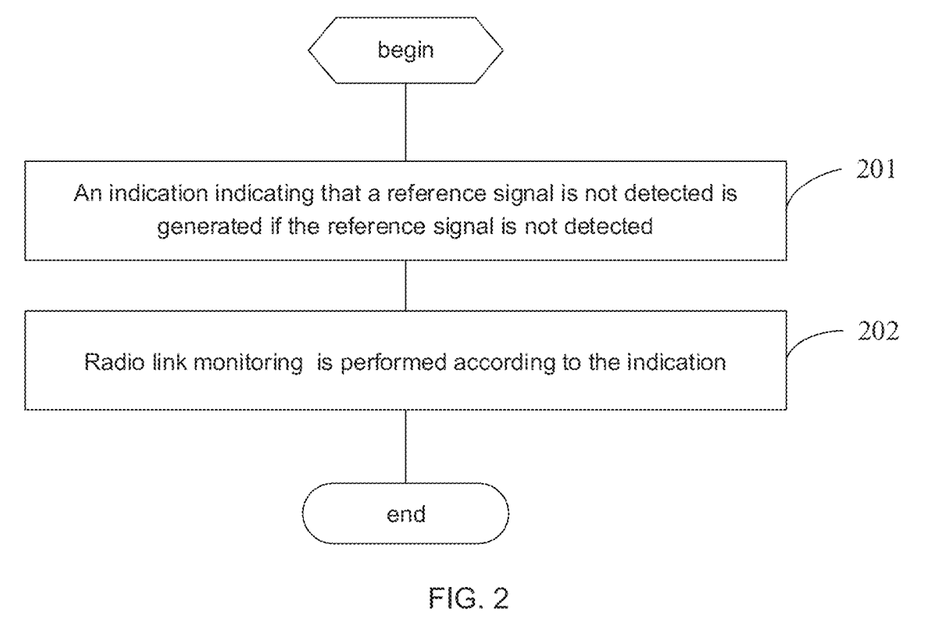
FIG. 2 is a flow diagram of a method for monitoring a radio link, in accordance with some embodiments of the present disclosure.

Referring to FIG. 2, FIG. 2 is a flow diagram of a method for monitoring a radio link, in accordance with some embodiments of the present disclosure. The method is applied to a terminal. As shown in FIG. 2, the method includes following steps.

In step 201, an indication indicating that a reference signal is not detected is generated if the reference signal is not detected.

In step 202, radio link monitoring (RLM) is performed according to the indication.

In the step 201, in a process of RLM performed by the terminal, in a case where the terminal does not detect a reference signal, the terminal may generate the indication, i.e., the indication indicating that the reference signal is not detected, according to indication information. The indication information is used for instructing the terminal to generate the indication that indicating the reference signal is not detected in a case where the terminal does not detect the reference signal.

The indication information may be pre-configured by the network side device or agreed by a protocol, or may also be directly pre-configured in the terminal, which is not limited herein.

In the step 202, after the terminal generates the indication indicating that the reference signal is not detected, the terminal may perform the RLM according to the indication indicating that the reference signal is not detected.

Performing the RLM according to the indication indicating that the reference signal is not detected may be that the terminal adjusts states of counters or timers in at least one counter and timer group in the terminal according to the indication indicating that the reference signal is not detected, and performs the RLM according to the states of the at least one counter and timer group.

The at least one counter and timer group may be pre-configured or agreed by a protocol, and each counter and timer group may include at least one counter and at least one timer.

In the related art, a first timer (e.g., T310), an out-of-sync indication counter (e.g., N310) and an in-sync indication counter (e.g., N311) are generally pre-configured in the terminal, and the terminal may perform the RLM through the first timer, the out-of-sync indication counter and the in-sync indication counter according to out-of-sync indications and in-sync indications, and the process is as follows.

When the terminal detects an out-of-sync indication, the terminal controls the out-of-sync indication counter to perform counting (e.g., adding 1), and when a count value of the out-of-sync indication counter reaches its threshold value (i.e., n310=N310), that is, when the terminal consecutively detects the threshold number of (e.g., N310) out-of-sync indications, the terminal starts the first timer. Before the count value of the out-of-sync indication counter reaches the threshold value, if the terminal receives an in-sync indication, the terminal resets the out-of-sync indication counter (i.e., n310=0).

Before the first timer expires, when a count value of the in-sync indication counter reaches its threshold value (i.e., n311=N311), that is, when the terminal consecutively detects the threshold number of (e.g., N311) in-sync indications, the terminal stops the first timer, and then the terminal determines and indicates that link synchronization is recovered. Before the count value of the in-sync indication counter reaches the threshold value, if the terminal receives the out-of-sync indication, the terminal resets the in-sync indication counter (i.e., n311=0).

In a case where the first timer expires, the terminal determines that the monitored radio link has a problem.

In some embodiments of the present disclosure, performing the RLM according to the indication indicating that the reference signal is not detected may be that the terminal performs the RLM according to the indication indicating that the reference signal is not detected through the first timer, the out-of-sync indication counter and the in-sync indication counter, so as to reduce the probability that the terminal determines wrongly that the monitored radio link has a problem.

In the process of performing the RLM by the terminal according to the indication indicating that the reference signal is not detected through the first timer, the out-of-sync indication counter and the in-sync indication counter, the out-of-sync indication counter, the in-sync indication counter and the first timer may respectively perform following actions by the terminal according to the indication indicating that the reference signal is not detected.

In a first action, in a case where the terminal generates the indication indicating that the reference signal is not detected, the terminal maintains the out-of-sync indication counter, i.e., maintains a current count value of the out-of-sync indication counter unchanged; or the terminal resets the out-of-sync indication counter, i.e., sets the current count value of the out-of-sync indication counter to an initial value (e.g., 0).

In a second action, in the case where the terminal generates the indication indicating that the reference signal is not detected, the terminal maintains the in-sync indication counter, i.e., maintains a current count value of the in-sync indication counter unchanged; or the terminal resets the in-sync indication counter, i.e., sets the current count value of the in-sync indication counter to an initial value (e.g., 0).

In a third action, in the case where the terminal generates the indication indicating that the reference signal is not detected, the terminal maintains the first timer, i.e., maintains the first timer to continue running; or the terminal resets the first timer, i.e., sets a current timing value of the first timer to an initial value (e.g., 0); or the first timer is suspended, that is, the first timer is suspended and maintains the current timing value.

In some embodiments of the present disclosure, the step 202 includes:

performing a first specific operation on a first counter according to the indication, and performing the RLM according to a count value of the first counter, wherein the first counter is the in-sync indication counter or the out-of-sync indication counter or performing a second specific operation on the first timer according to the indication, and performing the RLM according to the first timer. If the first timer expires, it is determined that radio link failure is detected.

Herein, the terminal may perform the RLM by performing an action in actions such as the first action to the third action on the in-sync indication counter, the out-of-sync indication counter or the first timer according to the indication indicating that the reference signal is not detected. Therefore, performing the RLM according to the indication indicating that the reference signal is not detected may be realized without adding either of a counter and a timer in the terminal in the related art, which is easy to implement and reduces the processing amount of the terminal.

Performing the RLM according to the first timer and performing the RLM according to the count value of the first counter mean that the terminal implements the RLM according to the states of the in-sync indication counter, the out-of-sync indication counter and the first timer in a monitoring procedure. For example, when the count value of the out-of-sync indication counter reaches the threshold value, start the first timer, and when the first timer expires, it is determined that the radio link has a problem; before the first timer expires, when the count value of the in-sync indication counter reaches the threshold value, stop the first timer and it is determined that synchronization of the radio link is recovered.

It will be noted that, the actions that the terminal controls the first counter and the first timer to perform according to the indication indicating that the reference signal is not detected may include, but are not limited to the first to third actions.

The first specific operation and the second specific operation may be any operation in which the terminal controls the in-sync indication counter, the out-of-sync indication counter or the first timer to perform an action according to the indication indicating that the reference signal is not detected to reduce a wrong determination rate during the RLM process. In some embodiments of the present disclosure, the first specific operation includes: maintaining the first counter, or resetting the first counter, and/or the second specific operation includes: maintaining the first timer, resetting the first timer, or suspending the first timer.

That is, it will be seen from the first action to the third action that, the terminal may control the out-of-sync indication counter or the in-sync indication counter according to the indication indicating that the reference signal is not detected, i.e., maintain the out-of-sync indication counter or the in-sync indication counter, or reset the out-of-sync indication counter or the in-sync indication counter; the terminal may also control the first timer according to the indication indicating that the reference signal is not detected, i.e., maintain the first timer, reset the first timer, or suspend the first timer.

Of course, the first specific operation and the second specific operation may include, but are not limited to, the operations of the first action to the third action.

In the third action, the terminal suspends the first timer, that is, the first timer is suspended and maintains the current timing value, and the terminal may also be set to resume timekeeping for the first timer according to a certain condition when the first timer is suspended, so as to make the result of the RLM more accurate.

In some embodiments of the present disclosure, the second specific operation is suspending the first timer.

After the second specific operation is performed on the first timer, the method further includes:

if an out-of-sync indication or an in-sync indication is detected, resuming timekeeping for the first timer.

That is, after the terminal suspends the first timer, the first timer may also perform flowing actions.

In a fourth action, when the terminal detects an out-of-sync indication or an in-sync indication, the terminal resumes timekeeping for the first timer, that is, the first timer continues to run from the current timing value.

Of course, the terminal may also pre-configure or agree by a protocol at least one of a counter and a timer corresponding to the indication indicating that the reference signal is not detected, and the terminal may perform the RLM through the at least one of the counter and the timer corresponding to the indication indicating that the reference signal is not detected according to the indication indicating that the reference signal is not detected. The number of counter(s) and timer(s) corresponding to the indication indicating that the reference signal is not detected may be set according to actual needs.

In some embodiments of the present disclosure, at least one of the counter and the timer corresponding to the indication indicating that the reference signal is not detected may include a second counter (e.g., N320) and a second timer (e.g., T320), and the terminal may perform the RLM through the second counter and the second timer, and the process is as follows.

When the terminal detects the indication indicating that the reference signal is not detected, the terminal controls the second counter to perform counting (e.g., add 1 to n320), and when a count value of the second counter reaches its threshold value (i.e., n320=N320), the terminal starts the second timer (e.g., T320).

In a case where the second timer expires, the terminal determines that the radio link has a problem.

In some embodiments of the present disclosure, the terminal may also perform the RLM through a group of the second counter and the second timer according to the indication indicating that the reference signal is not detected, so as to reduce the probability that the terminal determines wrongly that the monitored radio link has a problem.

Thus, in a process that the terminal performs the RLM through the second counter and the second timer according to the indication indicating that the reference signal is detected, the second counter and the second timer may perform following actions according to the indication indicating that the reference signal is detected.

In a fifth action, when the terminal detects the indication indicating that the reference signal is not detected, the terminal controls the second counter to perform counting (e.g., add 1 to n320).

In a sixth action, in a case where the count value of the second counter reaches its threshold value (i.e., n320=N320), the terminal starts the second timer (e.g., T320).

In a seventh action, in the case where the second timer expires, the terminal determines that the radio link has a problem.

It will be noted that, only the first timer, the out-of-sync indication counter and the in-sync indication counter, or only the second counter and the second timer may be provided in the terminal to perform the RLM through the first timer, the out-of-sync indication counter and the in-sync indication counter, or through the second counter and the second timer; or the first timer, the out-of-sync indication counter, the in-sync indication counter, the second counter and the second timer may be provided together in the terminal to implement the RLM.

In a process of implementing the RLM through the first timer, the out-of-sync indication counter, the in-sync indication counter, the second counter and the second timer, in a case where either of the first timer and the second timer expires, the terminal may determine that the radio link has a problem.

In some embodiments of the present disclosure, in the process of implementing the RLM by the terminal through the first timer, the out-of-sync indication counter, the in-sync indication counter, the second counter and the second timer, the terminal may control the second counter and the second timer perform following actions according to the out-of-sync indications, the in-sync indications, and the states of the out-of-sync indication counter, the in-sync indication counter and the first timer in the RLM process.

In an eighth action, when the terminal detects an in-sync indication, the terminal resets the second counter (i.e., sets the second counter to an initial value, such as n320=0).

In a ninth action, when the terminal detects an out-of-sync indication, the terminal resets the second counter (i.e., sets the second counter to the initial value, such as n320=0).

In a tenth action, when the terminal detects an in-sync indication, the terminal stops the second timer (i.e., sets the second timer to an initial value, such as T320=0, and stops the second timer running).

In an eleventh action, when the terminal detects an out-of-sync indication, the terminal stops the second timer (i.e., sets the second timer to the initial value, such as T320=0, and stops the second timer running).

In a twelfth action, when the terminal detects that the count value of the in-sync indication counter reaches the threshold value, i.e., consecutively detects in-sync indications, the number of which is equal to the threshold value of the in-sync indication counter, the terminal stops the second timer (i.e., sets the second timer to the initial value, such as T320=0, and stops the second timer).

Of course, in the process of implementing the RLM by the terminal through the first timer, the out-of-sync indication counter, the in-sync indication counter, the second counter and the second timer, the out-of-sync indication counter, the in-sync indication counter and the first timer may also perform following actions according to states of the second counter and the second timer.

In a thirteenth action, when the count value of the second counter reaches its threshold value, the terminal may reset the out-of-sync indication counter (i.e., set the out-of-sync indication counter to an initial value, such as n310=0), or control the out-of-sync indication counter to perform counting (e.g., add 1 to n310).

In a fourteenth action, when the count value of the second counter reaches its threshold value, the terminal may reset the in-sync indication counter (i.e., set the in-sync indication counter to an initial value, such as n311=0), or control the in-sync indication counter to perform counting (e.g., add 1 to n311).

In a fifteenth action, in the case where the second timer expires, the terminal may reset the out-of-sync indication counter (i.e., set the out-of-sync indication counter to an initial value, such as n310=0), or control the out-of-sync indication counter to perform counting (e.g., add 1 to n310).

In a sixteenth action, in the case where the second timer expires, the terminal may reset the in-sync indication counter (i.e., set the in-sync indication counter to the initial value, such as n311=0), or control the in-sync indication counter to perform counting (e.g., add 1 to n311).

In a seventeenth action, in the case where the second timer expires, the terminal may stop the first timer (i.e., set the first timer to the initial value, such as 0), or start the first timer, or restart the first timer.

Of course, in some embodiments of the present disclosure, in a case where the terminal is pre-configured with the first timer, the out-of-sync indication counter and the in-sync indication counter, the terminal may further be provided with the second counter corresponding to the indication indicating that the reference signal is not detected, and the terminal may implement the RLM through the first timer, the out-of-sync indication counter, the in-sync indication counter and the second counter, that is, whether the radio link has a problem is determined by whether the first timer expires or not.

In the process of implementing the RLM by the terminal through the first timer, the out-of-sync indication counter, the in-sync indication counter and the second counter, a following action may also be performed.

In an eighteenth action, when the count value of the second counter reaches its threshold value, the terminal starts the first timer.

Of course, in the process of implementing the RLM by the terminal through the first timer, the out-of-sync indication counter, the in-sync indication counter and the second counter, the first timer, the out-of-sync indication counter, the in-sync indication counter and the second counter may respectively perform corresponding actions in the first to the seventeenth actions, which will not be described herein again.

It will be noted that, in the process of performing the RLM by the terminal according to the indication indicating that the reference signal is not detected, at least one of the first to the eighteenth actions may be performed, but the terminal is not limited to perform the above actions.

In addition, the RLM may also be implemented by providing other counters or timers in the terminal in addition to providing at least one of the first timer, the out-of-sync indication counter, the in-sync indication counter, the second counter and the second timer in the terminal, which is also not limited herein.

In some embodiments of the present disclosure, performing the RLM in the step 202, includes:

controlling the second counter to perform counting according to the indication, and performing the RLM according to the count value of the second counter. The second counter is used for counting the indication.

In this way, by providing the second counter corresponding to the indication indicating that the reference signal is not detected in the terminal, the terminal may perform the RLM according to the count value of the second counter, which, compared with a method in which only the in-sync indication counter and the out-of-sync indication counter are provided in the terminal, makes the detection result of the RLM closer to the state of the radio link, reduces the probability that the radio link is determined wrongly to have a problem, and thus improves the accuracy of the result of the RLM.

It will be noted that, performing the RLM according to the count value of the second counter means that the terminal starts at least one of the first timer and the second timer according to the count value of the second counter, and determines the result of the RLM by whether at least one of the first timer and the second timer expires.

In the process of performing the RLM by the terminal according to the count value of the second counter, at least one of the out-of-sync indication counter, the in-sync indication counter, the first timer and the second timer may perform an action according to the count value of the second counter, so that the result of the RLM is affected to make the result of the RLM closer to a state of the radio link corresponding to a transmission state of the reference signal, and to reduce the probability that the radio link is determined wrongly to have a problem.

In some embodiments of the present disclosure, performing the RLM according to the count value of the second counter, includes:

if the count value of the second counter reaches a threshold value of the second counter, performing a third specific operation on the first counter, and performing the RLM according to the count value of the first counter; or if the count value of the second counter reaches the threshold value of the second counter, starting the first timer, and performing the RLM according to the first timer; or if the count value of the second counter reaches the threshold value of the second counter, determining that radio link failure is detected; or if the count value of the second counter reaches the threshold value of the second counter, starting the second timer, and performing the RLM according to the second timer.

As in the thirteenth action and the fourteenth action, when the count value of the second counter reaches its threshold value, the terminal may reset the in-sync indication counter or the out-of-sync indication counter, or control the in-sync indication counter or the out-of-sync indication counter to perform counting; in the sixth action, when the count value of the second counter reaches its threshold value, the terminal may start the second timer; in the eighteenth action, when the count value of the second counter reaches its threshold value, the terminal may start the first timer, and so on.

The third specific operation may be any operation in which the terminal controls the in-sync indication counter or the out-of-sync indication counter to perform an action according to the count value of the second counter to reduce the wrong determination rate during the RLM process. The third specific operation includes resetting the first counter or controlling the first counter to perform counting, i.e., the thirteenth action or the fourteenth action.

It will be noted that, the terminal controls at least one of the out-of-sync indication counter, the in-sync indication counter, the first timer and the second timer according to the count value of the second counter, which is not limited to corresponding actions of the first to the eighteenth actions.

In addition, as will be seen from the above, in a case where the terminal is pre-configured with the second counter and the second timer, when the count value of the second counter reaches the threshold value of the second counter, the terminal starts the second timer, and the terminal may perform the RLM according to the second timer.

In the process of performing the RLM by the terminal according to the second timer, the second timer may perform a certain action, or affect at least one of the in-sync indication counter, the out-of-sync indication counter and the first timer, so that the result of the RLM is affected or determined to make the result of the RLM closer to the state of the radio link corresponding to a transmission state of the reference signal, and to reduce the probability that the radio link is determined wrongly to have a problem.

In some embodiments of the present disclosure, performing the RLM according to the second timer, includes:

if the second timer expires, determining that radio link failure is detected; or if the second timer expires, performing the third specific operation on the first counter, and performing the RLM according to the count value of the first counter; or if the second timer expires, performing a fourth specific operation on the first timer, and performing the RLM according to the first timer; or if an out-of-sync indication or an in-sync indication is detected, stopping the second timer, and performing the RLM according to the first timer; or if the count value of the in-sync indication counter reaches the threshold value of the in-sync indication counter, stopping the second timer, and performing the RLM according to the first timer.

As in the seventh action, in the case where the second expires out, the terminal determines that the radio link has a problem; in the fifteenth action and the sixteenth action, in the case where the second timer expires, the terminal resets the in-sync indication counter or the out-of-sync indication counter, or controls the in-sync indication counter or the out-of-sync indication counter to perform counting; in the seventeenth action, in the case where the second timer expires, the terminal stops the first timer, or starts the first timer, or restarts the first timer; in the tenth action and the eleventh action, when the terminal detects the in-sync indication or the out-of-sync indication, the terminal stops the second timer, and so on.

The fourth specific operation may be any operation in which the terminal controls the first timer to perform an action after the second timer expires, to reduce the wrong determination rate during the RLM process. The fourth specific operation includes: stopping the first timer, starting the first timer, or restarting the first timer, i.e., the sixteenth action.

In addition, after the terminal controls the second counter to perform counting according to the indication indicating that the reference signal is not detected, the terminal may also control a state of the second counter according to a certain condition, so that the result of the RLM is more accurate.

In some embodiments of the present disclosure, after controlling the second counter to perform counting according to the indication, the method further includes:

if an out-of-sync indication or an in-sync indication is detected, resetting the second counter.

Herein, the terminal may reset the second counter according to the detected out-of-sync indication or in-sync indication, so that the result of the RLM is closer to the state of the radio link corresponding to a transmission state of the reference signal, and the probability that the radio link is determined wrongly to have a problem is reduced, i.e., the eighth action and the ninth action.

As will be seen from the above, at least one of the in-sync indication counter, the out-of-sync indication counter, the second counter, the first timer and the second timer may be provided in the terminal, and thus configuration information may be pre-configured or agreed by a protocol in the terminal. The configuration information includes information of at least one of the in-sync indication counter, the out-of-sync indication counter, the second counter, the first timer and the second timer, such as a threshold value.

The configuration information may be directly set in the terminal, or may also be transmitted by the network side device. When the configuration information is transmitted by the network side device, before the step 201, the method further includes:

receiving the configuration information, wherein the configuration information includes at least one of:

a threshold value of the second counter;

a threshold value of the first counter;

a threshold value of the first timer; and a threshold value of the second timer.

Herein, through the configuration information, the terminal may directly call a threshold value of each counter or timer in the configuration information during the RLM process, thereby increasing a processing speed of the terminal.

An implementation process of the method for monitoring the radio link is described herein, which includes following steps.

In step 1, the network side device configures the configuration information or the configuration information is agreed by a protocol, the configuration information is used by the terminal for performing the RLM, the configuration information includes any combination of one or more of the following items:

a threshold value (e.g., N320) of an "indication indicating that a reference signal corresponding to the RLM is not detected" counter (i.e., the second counter);

a threshold value (e.g., maxT320) of a timer (i.e., the second timer) started after the "indication indicating that the reference signal corresponding to the RLM is not detected" counter reaches its threshold value;

a threshold value (e.g., N310) of an "out-of-sync indication" counter (i.e., the out-of-sync indication counter);

a threshold value (e.g., N311) of an "in-sync indication" counter (i.e., the in-sync indication counter); and a threshold value (e.g., T310) of a timer (i.e., the first timer) for determining a radio link problem, which is started after the "out-of-sync indication" counter reaches its threshold value.

In step 2, the terminal monitors the state of the radio link according to the indication information in the step 1. The actions of the RLM include:

when the terminal detects N310 consecutive "out-of-sync" indications, the terminal starts a T310 timer (for example, every time the terminal detects one "out-of-sync" indication, the terminal increments an n310 counter by 1 (an initial value of the counter may be 0), and when n310 is equal to N310, the terminal starts the T310 timer. In a counting process of the n310 counter, if the terminal detects one "in-sync" indication, the terminal resets the n310 counter (that is, n310 is set to be 0));

when the terminal detects N311 consecutive "in-sync" indications, if the T310 timer is running, the terminal stopping the T310 timer (for example, every time the terminal detects one "in-sync" indication, the terminal increments an n311 counter by 1 (an initial value of the counter may be 0), and when n311 is equal to N311, if the T310 timer is running, the terminal stops the T310 timer. In a counting process of the n311 counter, if the terminal detects one "out-of-sync" indication, the terminal resets the n311 counter (that is, n311 is set to be 0)); and if the T310 timer expires, the terminal determines that the monitored radio link has a problem.

In some embodiments of the present disclosure, the action of the RLM of the terminal includes any combination of one or more following items.

Every time the terminal detects one "indication indicating that the reference signal corresponding to the RLM is not detected", the terminal increments the counter (e.g., n320) corresponding to the "indication indicating that the reference signal corresponding to the RLM is not detected" by 1.

Every time the terminal detects one "indication indicating that the reference signal corresponding to the RLM is not detected", the terminal maintains the current n310 counter (i.e., maintains the current count value unchanged) or resets the current n310 counter (i.e., sets the current n310 counter to an initial value, such as "0").

Every time the terminal detects one "indication indicating that the reference signal corresponding to the RLM is not detected", the terminal maintains the current n311 counter (i.e., maintains the current count value unchanged) or resets the current n311 counter (i.e., sets the current n311 counter to an initial value, such as "0").

Every time the terminal detects one "indication indicating that the reference signal corresponding to the RLM is not detected", the terminal maintains the current T310 timer (that is, the current T310 timer continues running), resets the current T310 timer (i.e., sets the current T310 timer to an initial value, such as "0") or suspends the current T310 timer (that is, the current T310 timer is suspended running and maintains the current timing value).

If the T310 timer of the terminal is in a suspended state, when the terminal detects the "out-of-sync" indication or the "in-sync" indication, the terminal resumes the T310 timer (that is, the T310 timer continues running from the current timing value).

When the counter corresponding to the "indication indicating that the reference signal corresponding to the RLM is not detected" of the terminal reaches a threshold value (e.g., n320=N320), the terminal resets the current n310 counter (i.e., sets the current n310 counter to the initial value, such as "0") or increments the current n310 counter by 1.

When the counter corresponding to the "indication indicating that the reference signal corresponding to the RLM is not detected" of the terminal reaches the threshold value (e.g., n320=N320), the terminal resets the current n311 counter (i.e., sets the current n311 counter to the initial value, such as "0").

When the counter corresponding to the "indication indicating that the reference signal corresponding to the RLM is not detected" of the terminal reaches the threshold value (e.g., n320=N320), the terminal starts a timer for determining a radio link problem (the timer may be the T310, or may be an additional timer T320).

When the T320 expires, the terminal determines that the radio link has a problem.

When the T320 expires, the terminal resets the current n310 counter (i.e., sets the current n310 counter to the initial value, such as "0") or increments the current n310 counter by 1.

When the T320 expires, the terminal resets the current n311 counter (i.e., sets the current n311 counter to the initial value, such as "0").

When the T320 expires, the terminal stops the T310 timer (i.e., sets the T310 timer to the initial value, such as "0") or starts the T310 timer or restarts the T310 timer.

When the terminal detects one "out-of-sync" indication, the terminal resets the counter (e.g., n320) corresponding to the "indication indicating that the reference signal corresponding to the RLM is not detected" (i.e., sets the counter to an initial value, such as "0").

When the terminal detects one "in-sync" indication, the terminal resets the counter (e.g., n320) corresponding to the "indication indicating that the reference signal corresponding to the RLM is not detected" (i.e., sets the counter to the initial value, such as "0").

When the terminal detects one "out-of-sync" indication, the terminal stops the T320 (i.e., sets the T320 to the initial value (such as "0"), and stops the timer running).

When the terminal detects one "in-sync" indication, the terminal stops the T320 (i.e., sets the T320 to the initial value (such as "0"), and stops the timer running).

When the terminal detects N311 consecutive "in-sync" indications, the terminal stops the T320 (i.e., sets the T320 to the initial value (such as "0"), and stops the timer running).

In some embodiments of the present disclosure, if the reference signal is not detected, the indication indicating that the reference signal is not detected is generated: and the RLM is performed according to the indication. In this way, when the terminal does not receive a reference signal, the terminal may perform the RLM according to the indication indicating that the reference signal is not detected, which, compared with a method in which the monitoring result is obtained only according to the out-of-sync indications and the in-sync indications, makes the monitoring result of the RLM closer to a state of the radio link, reduces the probability that the radio link is determined wrongly to have a problem, and thus improves the accuracy of the result of the RLM.

Figure 3:
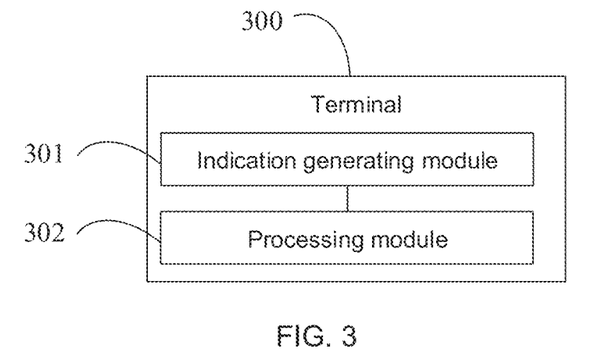
FIG. 3 is a block diagram of a terminal, in accordance with some embodiments of the present disclosure.

Referring to FIG. 3, FIG. 3 is a block diagram of a terminal, in accordance with some embodiments of the present disclosure, and as shown in FIG. 3, the terminal 300 includes:

an indication generating module 301 for generating an indication indicating that a reference signal is not detected if the reference signal is not detected;

a processing module 302 for performing the RLM according to the indication.

In some embodiments of the present disclosure, the processing module 302 is used to:

perform a first specific operation on a first counter according to the indication, and perform the RLM according to a count value of the first counter, the first counter is an in-sync indication counter or an out-of-sync indication counter; or perform a second specific operation on the first timer according to the indication, and perform the RLM according to the first timer, wherein if the first timer expires, it is determined that radio link failure is detected.

In some embodiments of the present disclosure, the first specific operation includes: maintaining the first counter, or resetting the first counter; and/or the second specific operation includes: maintaining the first timer, resetting the first timer, or suspending the first timer.

In some embodiments of the present disclosure, the second specific operation is suspending the first timer;

the processing module 302 is further used to:

if an out-of-sync indication or an in-sync indication is detected, resume timekeeping for the first timer.

In some embodiments of the present disclosure, the processing module 302 is used to:

control the second counter to perform counting according to the indication, and perform the RLM according to the count value of the second counter, the second counter is used for counting the indication.

In some embodiments of the present disclosure, the processing module 302 is used to:

if the count value of the second counter reaches the threshold value of the second counter, perform the third specific operation on the first counter, and perform the RLM according to the count value of the first counter; or if the count value of the second counter reaches the threshold value of the second counter, start the first timer, and perform the RLM according to the first timer; or if the count value of the second counter reaches the threshold value of the second counter, determine that radio link failure is detected.

In some embodiments of the present disclosure, the third specific operation includes resetting the first counter, or controlling the first counter to perform counting.

In some embodiments of the present disclosure, the processing module 302 is used to:

if the count value of the second counter reaches the threshold value of the second counter, start the second timer, and perform the RLM according to the second timer.

In some embodiments of the present disclosure, the processing module 302 is used to:

if the second timer expires, determine that radio link failure is detected; or if the second timer expires, perform the third specific operation on the first counter, and perform the RLM according to the count value of the first counter, or if the second timer expires, perform the fourth specific operation on the first timer, and perform the RLM according to the first timer; or if the out-of-sync indication or the in-sync indication is detected, stop the second timer, and perform the RLM according to the first timer, or if the count value of the in-sync indication counter reaches the threshold value of the in-sync indication counter, stop the second timer, and perform the RLM according to the first timer.

In some embodiments of the present disclosure, the fourth specific operation includes: stopping the first timer, starting the first timer, or restarting the first timer.

In some embodiments of the present disclosure, the processing module 302 is further used to:

if the out-of-sync indication or the in-sync indication is detected, reset the second counter.

Figure 4:
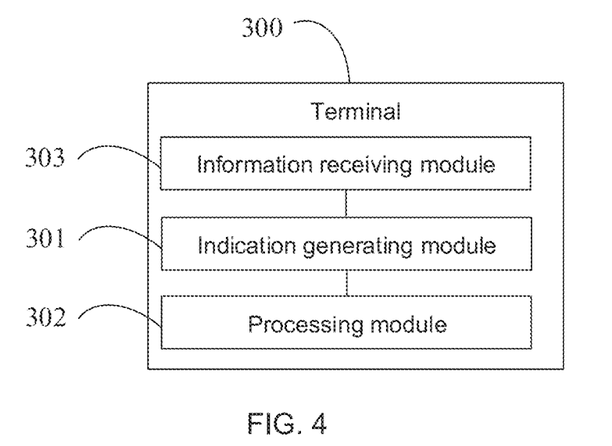
FIG. 4 is a block diagram of another terminal, in accordance with some embodiments of the present disclosure.

In some embodiments of the present disclosure, as shown in FIG. 4, the terminal 300 further includes:

an information receiving module 303 used to receive configuration information, the configuration information includes at least one of:

the threshold value of the second counter;
the threshold value of the first counter;
the threshold value of the first timer; and
the threshold value of the second timer.

It will be noted that, in some embodiments of the present disclosure, the terminal 300 may be a terminal in any implementation manner in the method embodiments, and any implementation manner of the terminal in the method embodiments may be implemented by the terminal 300 in some embodiments of the present disclosure, and the same beneficial effects may be achieved. In order to avoid repetition, details will not be repeated herein.

Figure 5:
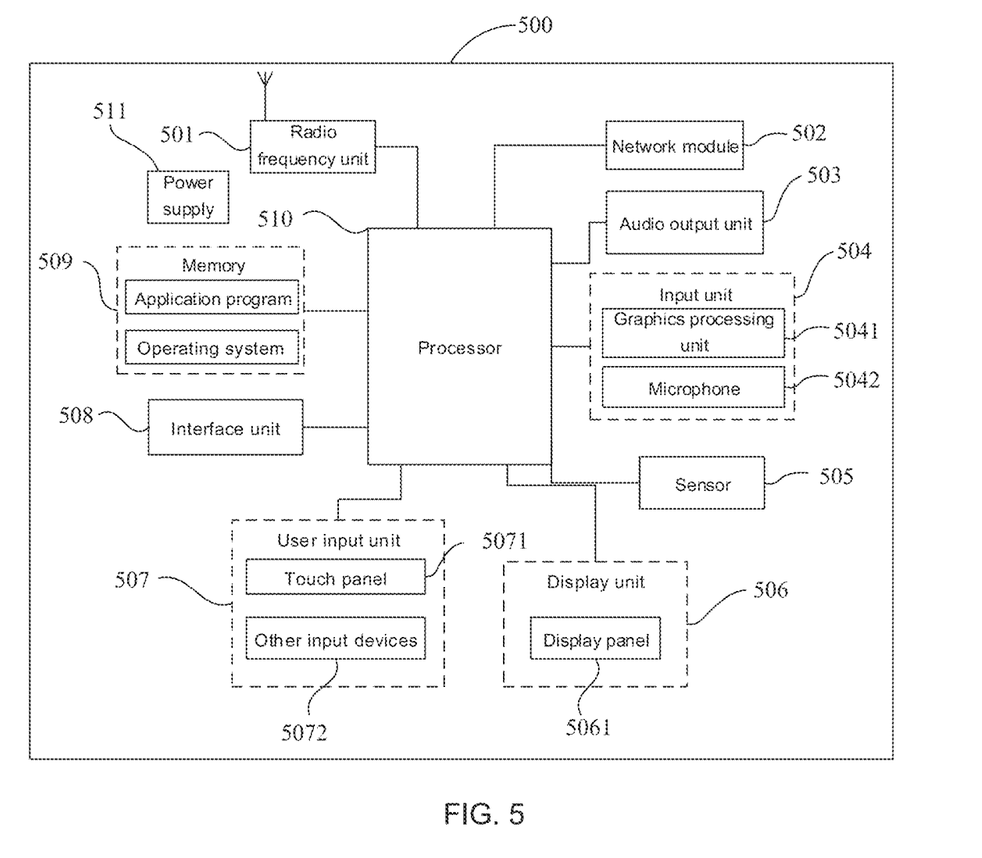
FIG. 5 is a block diagram of yet another terminal, in accordance with some embodiments of the present disclosure.

Referring to FIG. 5, FIG. 5 is a schematic diagram of a hardware structure of a terminal for implementing all embodiments of the present disclosure. The terminal 500 may include, but is not limited to, components such as a radio frequency unit 501, a network module 502, an audio output unit 503, an input unit 504, a sensor 505, a display unit 506, a user input unit 507, an interface unit 508, a memory 509, a processor 510 and a power supply 511. A person skilled in the art can understand that the terminal 500 shown in FIG. 5 does not constitute a limitation on the terminal, and that the terminal may include more or fewer components than the terminal shown, or a combination of certain components, or a different arrangement of components. In some embodiments of the present disclosure, the terminal includes, but is not limited to, a mobile phone, a tablet computer, a notebook computer, a palmtop computer, a vehicle-mounted terminal, a wearable device or a pedometer.

In some embodiments of the present disclosure, the processor 510 is configured to:

generate an indication indicating that a reference signal is not detected if the reference signal is not detected; and
perform the RLM according to the indication.

In some embodiments of the present disclosure, the processor 510 is configured to:

perform a first specific operation on a first counter according to the indication, and perform the RLM according to a count value of the first counter, wherein the first counter is an in-sync indication counter or an out-of-sync indication counter; or perform a second specific operation on the first timer according to the indication, and perform the RLM according to the first timer, wherein if the first timer expires, it is determined that radio link failure is detected.

In some embodiments of the present disclosure, the first specific operation includes: maintaining the first counter, or resetting the first counter; and/or the second specific operation includes: maintaining the first timer, resetting the first timer, or suspending the first timer.

In some embodiments of the present disclosure, the second specific operation is suspending the first timer;

In some embodiments of the present disclosure, the processor 510 is further configured to:

if the out-of-sync indication or the in-sync indication is detected, resume the first timer.

In some embodiments of the present disclosure, the processor 510 is configured to:

control the second counter to perform counting according to the indication, and perform the RLM according to the count value of the second counter, wherein the second counter is used for counting the indication.

In some embodiments of the present disclosure, the processor 510 is configured to:

if the count value of the second counter reaches the threshold value of the second counter, perform the third specific operation on the first counter, and perform the RLM according to the count value of the first counter; or if the count value of the second counter reaches the threshold value of the second counter, start the first timer, and perform the RLM according to the first timer; or if the count value of the second counter reaches the threshold value of the second counter, determine that radio link failure is detected.

In some embodiments of the present disclosure, the third specific operation includes resetting the first counter, or controlling the first counter to perform counting.

In some embodiments of the present disclosure, the processor 510 is configured to:

if the count value of the second counter reaches the threshold value of the second counter, start the second timer, and perform the RLM according to the second timer.

In some embodiments of the present disclosure, the processor 510 is configured to:

if the second timer expires, determine that radio link failure is detected; or if the second timer expires, perform the third specific operation on the first counter, and perform the RLM according to the count value of the first counter; or if the second timer expires, perform the fourth specific operation on the first timer, and perform the RLM according to the first timer, or if the out-of-sync indication or the in-sync indication is detected, stop the second timer, and perform the RLM according to the first timer, or if the count value of the in-sync indication counter reaches the threshold value of the in-sync indication counter, stop the second timer, and perform the RLM according to the first timer.

In some embodiments of the present disclosure, the fourth specific operation includes: stopping the first timer, starting the first timer, or restarting the first timer.

In some embodiments of the present disclosure, the processor 510 is further configured to:

if the out-of-sync indication or the in-sync indication is detected, reset the second counter.

In some embodiments of the present disclosure, a radio frequency unit 501 is configured to:

receive the configuration information, the configuration information includes at least one of:

the threshold value of the second counter;
the threshold value of the first counter;
the threshold value of the first timer; and
the threshold value of the second timer.

In some embodiments of the present disclosure, the indication indicating that the reference signal is not detected is generated if the reference signal is not detected; and the RLM is performed according to the indication. In this way, when the terminal does not receive the reference signal, the terminal may perform the RLM according to the indication indicating that the reference signal is not detected, which, compared with a method in which the monitoring result is obtained only according to the out-of-sync indication and the in-sync indication, makes the monitoring result of the RLM closer to a state of the radio link, reduces the probability that the radio link is determined wrongly to have a problem, and thus improves the accuracy of the result of the RLM.

It will be understood that, in some embodiments of the present disclosure, the radio frequency unit 501 may be used for receiving and sending signals during a process of sending and receiving information or a call, receiving downlink data from a base station, and then transmitting the downlink data to the processor 510 to be processed; in addition, sending uplink data to the base station. Generally, the radio frequency unit 501 includes, but is not limited to, an antenna, at least one amplifier, a transceiver, a coupler, a low noise amplifier and a duplexer. In addition, the radio frequency unit 501 may also communicate with a network and other devices through a wireless communication system.

The UE provides wireless broadband Internet access for the user through the network module 502, such as helping the user to send and receive emails, browse web pages and access streaming media.

The audio output unit 503 may convert audio data received by the radio frequency unit 501 or the network module 502 or stored in the memory 509 into audio signals and output the audio signals as sound. Moreover, the audio output unit 503 may further provide audio output (e.g., a call signal reception sound, a message reception sound, etc.) related to a specific function performed by the terminal 500. The audio output unit 503 includes a speaker, a buzzer, a receiver, etc.

The input unit 504 is used to receive audio or video signals. The input unit 504 may include a graphics processing unit (GPU) 5041 and a microphone 5042. The GPU 5041 processes image data of still pictures or videos obtained by an image capture device (e.g., a camera) in a video capture mode or an image capture mode. Processed image frames may be displayed on the display unit 506. The image frames processed by the GPU 5041 may be stored in the memory 509 (or other storage media) or sent via the radio frequency unit 501 or the network module 502. The microphone 5042 may receive sound, and may process such sound into audio data. The processed audio data may be converted into a format output that may be sent to a mobile communication base station via the radio frequency unit 501 in a case of a telephone call mode.

The terminal 500 further includes at least one type of sensor 505, such as a light sensor, a motion sensor and other sensors. The light sensor includes an ambient light sensor and a proximity sensor. The ambient light sensor may adjust brightness of a display panel 5061 according to brightness of the ambient light. The proximity sensor may turn off the display panel 5061 and/or backlight when the terminal 500 is moved to an ear. As a type of motion sensor, an accelerometer sensor may detect a magnitude of acceleration in all directions (generally three axes), and may detect a magnitude and a direction of gravity when the accelerometer sensor is stationary, and may be used to identify a gesture of the UE (e.g., horizontal-vertical screen switching, related games, and magnetometer attitude calibration), vibration recognition related functions (e.g., pedometer and tapping), etc. The sensors 505 may further include a fingerprint sensor, a pressure sensor, an iris sensor, a molecular sensor, a gyroscope, a barometer, a hygrometer, a thermometer and an infrared sensor, which will not be described in detail herein.

The display unit 506 is used to display information input by the user or information supplied to the user. The display unit 506 may include the display panel 5061, and the display panel 5061 may be configured in a form of a liquid crystal display (LCD), an organic light-emitting diode (OLED), or the like.

The user input unit 507 may be used to receive input digital or character information and generate key signal input related to user settings and function control of the UE. The user input unit 507 includes a touch panel 5071 and other input devices 5072. The touch panel 5071, also known as a touch screen, may collect the user's touch operations on or near the touch panel 5071 (e.g., the user's operations on or near the touch panel 5071 by using any suitable object or attachment such as a finger and a touch pen). The touch panel 5071 may include two parts, i.e., a touch detection device and a touch controller. The touch detection device detects a user's touch position, detects a signal brought by the touch operation, and transmits the signal to the touch controller; the touch controller receives touch information from the touch detection device, converts the touch information into coordinates of a touch point, sends the coordinates of the touch point to the processor 510, receives a command from the processor 510 and performs the command. In addition, the touch panel 5071 may be implemented by using various types of touch panels such as a resistive touch panel, a capacitive touch panel, an infrared touch panel, or a surface acoustic wave touch panel. In addition to the touch panel 5071, the user input unit 507 may further include the other input devices 5072. The other input devices 5072 may include, but are not limited to, a physical keyboard, function keys (e.g., volume control keys, switch keys, etc.), a trackball, a mouse and a joystick, which will not be described in detail herein.

The touch panel 5071 may be overlaid on the display panel 5061. After the touch panel 5071 detects a touch operation on or near it, the touch panel 5071 transmits the touch operation to the processor 510 to determine a type of the touch event, and then the processor 510 provides a corresponding visual output on the display panel 5061 according to the type of the touch event. Although in FIG. 5, the touch panel 5071 and the display panel 5061 are used as two separate components to implement input and output functions of the UE, in some embodiments, the touch panel 5071 and the display panel 5061 may be integrated to implement the input and output functions of the UE, which is not limited herein.

The interface unit 508 is an interface for connecting an external device and the terminal 500. For example, the external device may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 508 may be used to receive input (e.g., data information or power) from the external device and transmit the received input to one or more elements in the terminal 500, or may be used to transmit data between the terminal 500 and the external device.

The memory 509 may be used to store software programs and various data. The memory 509 may mainly include a program storage area and a data storage area. The program storage area may store an operating system and at least one application program required for functions (e.g., a sound playing function and an image playing function). The data storage area may store data (e.g., audio data and a phone book) created according to use of a mobile phone. In addition, the memory 509 may include a high-speed random access memory, and may further include a non-volatile memory, such as at least one magnetic disk storage device, a flash memory device, or other non-volatile solid-state storage devices.

The processor 510 is a control center of the UE, connects all parts of the entire UE through various interfaces and wirings, and performs various functions of the UE and processes data by running or executing software programs and/or modules stored in the memory 509 and calling data stored in the memory 509, thereby performing overall monitoring on the UE. The processor 510 may include one or more processing units. In some embodiments of the present disclosure, an application processor and a modem processor may be integrated in the processor 510. The application processor mainly deals with operating systems, user interfaces and application programs, and the modem processor mainly deals with wireless communication. It can be understood that the modem processor may not be integrated into the processor 510.

The terminal 500 may further include the power supply 511 (e.g., a battery) for supplying power to all components. The power supply 511 may be logically connected to the processor 510 through a power management system, so that functions such as charging management, discharging management, and power consumption management are achieved through the power management system.

In addition, the terminal 500 includes some functional modules that are not shown, which will not be described in details herein.

Some embodiments of the present disclosure further provide a terminal 500, which includes the processor 510, the memory 509, and a computer program that is stored in the memory 509 and is executable on the processor 510. The computer program, when executed by the processor 510, implements all processes of the embodiments of the method for monitoring a radio link, which may achieve the same technical effects. In order to avoid repetition, details will not be repeated herein.

Some embodiments of the present disclosure further provide a non-transient computer-readable storage medium. The non-transient computer-readable storage medium has stored thereon a computer program that, when executed by a processor, implements all processes of the method for monitoring a radio link at a terminal side provided by some embodiments of the present disclosure, which may achieve the same technical effects. In order to avoid repetition, details will not be repeated herein. The non-transient computer-readable storage medium may be a read-only memory (ROM), a random access memory (RAM), a magnetic disk or an optical disk.

It will be noted that, the terms such as "include", "comprise" or any other variants thereof herein are intended to cover a non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "comprising a . . . " does not exclude existence of other identical elements in a process, a method, an article or a device that includes the element.

Through the description of the above embodiments, a person skilled in the art will clearly understand that, the method in the above embodiments may be implemented by software plus a necessary general-purpose hardware platform, and of course, may also be implemented by hardware, but in many cases, the former is a better implementation. On a basis of such understanding, the technical solution of the present disclosure may be embodied in a form of a software product in essence or in a part contributing to the related art. The computer software product is stored in a storage medium (e.g., a ROM/RAM, a diskette or an optical disk), and includes several instructions for causing a terminal (which may be a mobile phone, a computer, a server, an air conditioner or a network side device) to perform the methods described in all embodiments of the present disclosure.

The above description is only for some embodiments of the present disclosure, but the protection scope of the present disclosure is not limited thereto, and variations or substitutions within the technical scope of the present disclosure that any person skilled in the art may readily conceive of shall be included in the protection scope of the present disclosure. Therefore, the protection scope of the present disclosure shall be subject to the protection scope of the claims.

What is claimed is:

1. A method for monitoring a radio link, applied to a terminal, the method comprising:
    generating an indication indicating that a reference signal is not detected if the reference signal is not detected; and
    performing radio link monitoring according to the indication; wherein
    performing the radio link monitoring according to the indication comprises:
        performing a first specific operation on a first counter according to the indication, and performing the radio link monitoring according to a count value of the first counter, wherein the first counter is an in-sync indication counter or an out-of-sync indication counter; or
        performing a second specific operation on a first timer according to the indication, and performing the radio link monitoring according to the first timer, wherein if the first timer expires, it is determined that radio link failure is detected; or
        controlling a second counter to perform counting according to the indication, and performing the radio link monitoring according to a count value of the second counter, wherein the second counter is used for counting the indication.

2. The method according to claim 1, wherein the first specific operation comprises: maintaining the first counter, or resetting the first counter.

3. The method according to claim 1, wherein the second specific operation comprises: maintaining the first timer, resetting the first timer, or suspending the first timer.

4. The method according to claim 3, wherein the second specific operation is suspending the first timer;
    after performing the second specific operation on the first timer, the method further comprises:
    if an out-of-sync indication or an in-sync indication is received, resuming timekeeping for the first timer.

5. The method according to claim 1, wherein performing the radio link monitoring according to the count value of the second counter, comprises:
    if the count value of the second counter reaches a threshold value of the second counter, performing a third specific operation on a first counter, and performing the radio link monitoring according to a count value of the first counter; or
    if the count value of the second counter reaches the threshold value of the second counter, starting a first timer, and performing the radio link monitoring according to the first timer; or
    if the count value of the second counter reaches the threshold value of the second counter, determining that radio link failure is detected.

6. The method according to claim 5, wherein the third specific operation comprises resetting the first counter or controlling the first counter to perform counting.

7. The method according to claim 5, wherein the first timer is T310.

8. The method according to claim 1, wherein performing the radio link monitoring according to the count value of the second counter, comprises:
    if the count value of the second counter reaches a threshold value of the second counter, starting a second timer, and performing the radio link monitoring according to the second timer.

9. The method according to claim 8, wherein performing the radio link monitoring according to the second timer, comprises:
    if the second timer expires, determining that radio link failure is detected; or
    if the second timer expires, performing a third specific operation on a first counter, and performing the radio link monitoring according to a count value of the first counter; or
    if the second timer expires, performing a fourth specific operation on a first timer, and performing the radio link monitoring according to the first timer; or
    if an out-of-sync indication or an in-sync indication is received, stopping the second timer, and performing the radio link monitoring according to the first timer; or
    if a count value of an in-sync indication counter reaches a threshold value of the in-sync indication counter, stopping the second timer, and performing the radio link monitoring according to the first timer.

10. The method according to claim 9, wherein the fourth specific operation comprises: stopping the first timer, starting the first timer, or restarting the first timer.

11. The method according to claim 8, wherein the second timer is T320.

12. The method according to claim 1, wherein after controlling the second counter to perform counting according to the indication, the method further comprises:
    if an out-of-sync indication or an in-sync indication is received, resetting the second counter.

13. The method according to claim 1, wherein before generating the indication indicating that the reference signal is not detected if the reference signal is not detected, the method further comprises:

receiving configuration information, wherein the configuration information includes at least one of:
a threshold value of a second counter;
a threshold value of a first counter;
a threshold value of a first timer; and
a threshold value of a second timer.

14. A terminal, comprising:
a processor is configured to:
generate an indication indicating that a reference signal is not detected if the reference signal is not detected; and
perform radio link monitoring according to the indication; wherein
the processor is configured to:
perform a first specific operation on a first counter according to the indication, and perform the radio link monitoring according to a count value of the first counter, wherein the first counter is an in-sync indication counter or an out-of-sync indication counter; or
perform a second specific operation on a first timer according to the indication, and perform the radio link monitoring according to the first timer, wherein if the first timer expires, it is determined that radio link failure is detected; or
control a second counter to perform counting according to the indication, and perform the radio link monitoring according to a count value of the second counter, wherein the second counter is used for counting the indication.

15. The terminal according to claim 14, wherein the terminal further comprises:
a radio frequency unit is configured to receive configuration information, wherein the configuration information includes at least one of:
a threshold value of a second counter;
a threshold value of a first counter;
a threshold value of a first timer; and
a threshold value of a second timer.

16. The terminal according to claim 14, wherein the processor is configured to:
if the count value of the second counter reaches a threshold value of the second counter, perform a third specific operation on a first counter, and perform the radio link monitoring according to a count value of the first counter; or
if the count value of the second counter reaches the threshold value of the second counter, start a first timer, and perform the radio link monitoring according to the first timer; or
if the count value of the second counter reaches the threshold value of the second counter, determine that radio link failure is detected.

17. The terminal according to claim 14, wherein the processor is configured to:
if the count value of the second counter reaches a threshold value of the second counter, start a second timer, and perform the radio link monitoring according to the second timer.

18. A non-transient computer-readable storage medium, wherein the non-transient computer-readable storage medium has stored thereon a computer program that, when executed by a processor, implements the method comprising:
generating an indication indicating that a reference signal is not detected if the reference signal is not detected; and
performing radio link monitoring according to the indication; wherein
performing the radio link monitoring according to the indication comprises:
performing a first specific operation on a first counter according to the indication, and performing the radio link monitoring according to a count value of the first counter, wherein the first counter is an in-sync indication counter or an out-of-sync indication counter; or
performing a second specific operation on a first timer according to the indication, and performing the radio link monitoring according to the first timer, wherein if the first timer expires, it is determined that radio link failure is detected; or
controlling a second counter to perform counting according to the indication, and performing the radio link monitoring according to a count value of the second counter, wherein the second counter is used for counting the indication.

19. The non-transient computer-readable storage medium according to claim 18, wherein the computer program, when executed by the processor, implements the method comprising:
if the count value of the second counter reaches a threshold value of the second counter, performing a third specific operation on a first counter, and performing the radio link monitoring according to a count value of the first counter; or
if the count value of the second counter reaches the threshold value of the second counter, starting a first timer, and performing the radio link monitoring according to the first timer; or
if the count value of the second counter reaches the threshold value of the second counter, determining that radio link failure is detected.

20. The non-transient computer-readable storage medium according to claim 18, wherein the computer program, when executed by the processor, implements the method comprising:
if the count value of the second counter reaches a threshold value of the second counter, starting a second timer, and performing the radio link monitoring according to the second timer.

* * * * *